Sept. 10, 1963    C. J. KAISER, JR    3,103,632
ELIMINATION OF COINCIDENT AMBIGUITY
Filed April 5, 1961    4 Sheets-Sheet 2
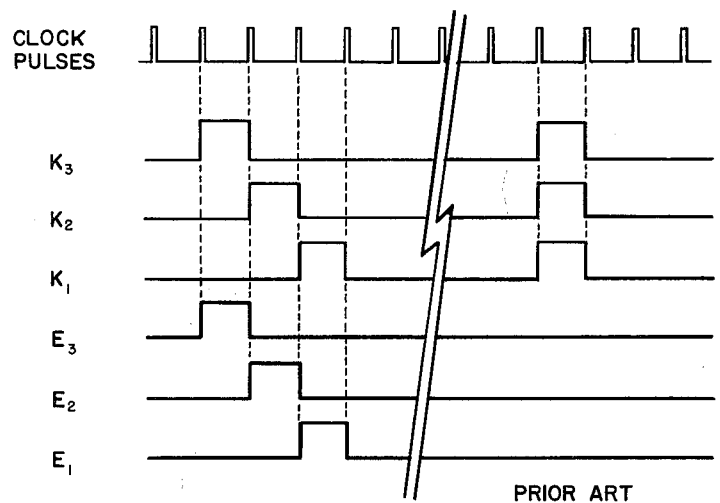
FIG_2a
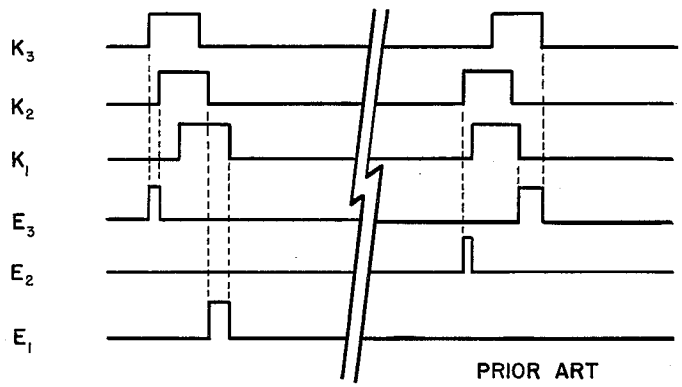
FIG_2b
INVENTOR.
CONRAD J. KAISER JR.
BY
Agent

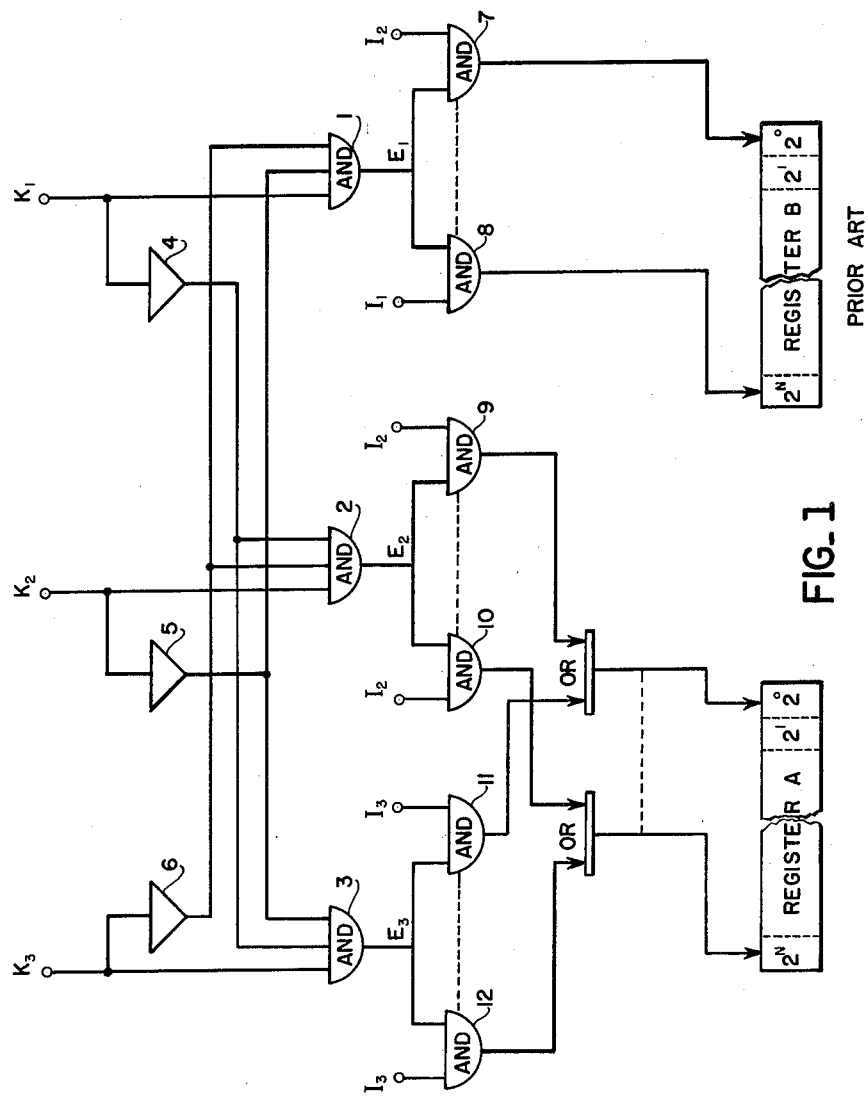
FIG_1

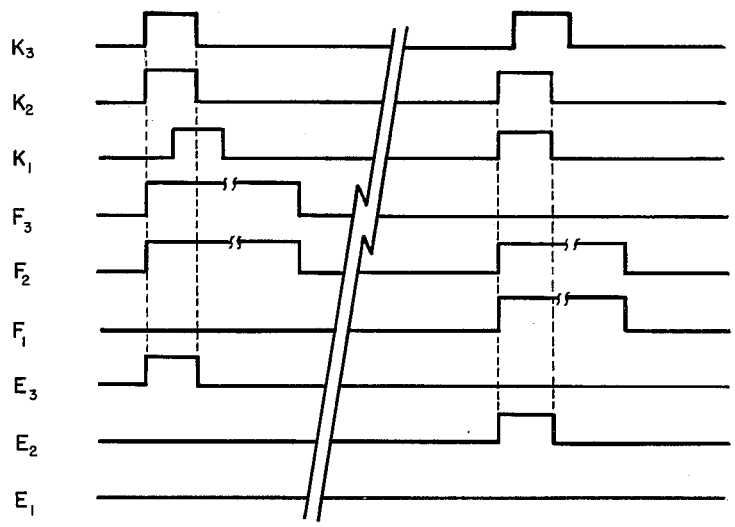
FIG_4a
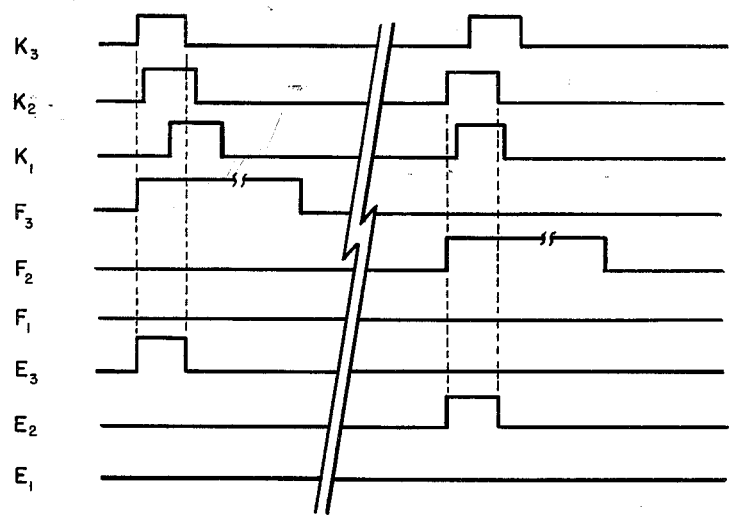
FIG_4b
INVENTOR.
CONRAD J. KAISER JR.

United States Patent Office 3,103,632
Patented Sept. 10, 1963

3,103,632
ELIMINATION OF COINCIDENT AMBIGUITY
Conrad J. Kaiser, Jr., Dunellen, N.J., assignor, by mesne assignments, to Lockheed Aircraft Corporation, Burbank, Calif., a corporation of California
Filed Apr. 5, 1961, Ser. No. 101,004
8 Claims. (Cl. 328—92)

This invention relates to computer logic circuitry and more particularly to a method and means for eliminating coincident ambiguity in logical circuits when two or more control signals occur simultaneously.

Problems of signal coincidence have always existed in digital machines. However, they have, until quite recently, been largely thought of as "bugs" in the logical design, in much the same way as superfluous states have been considered. With the advance of non-synchronous computing techniques, coincident or so-called "race" conditions are commonplace. Indeed, they are inherent in the philosophy of the technique itself. Such techniques are largely responsible for the advances in the study of "race" conditions.

Most digital systems are designed to operate with input signals which are well defined and non-ambiguous in their occurrence. Specific effort is put forth on the part of the logical designer, to assure the mutual exclusiveness of all input signals. Those signals which are not mutually exclusive are separated out and utilized in independent networks, in such a manner as to prevent their interference with one another.

There are, however, other situations in which the relationship of the input signals to each other cannot be predetermined. It is in these instances that the techniques of the present invention apply.

An object of the invention is to eliminate the coincident ambiguity in logical circuits.

Another object of the invention is to provide a means to eliminate ambiguous signals in digital systems due to several control signals occurring simultaneously.

A further object of the invention is to provide elimination of coincidence ambiguity by "weighting" the random input signals on a priority basis.

A further object of the invention is to provide a single output control signal from a plurality of random input signals.

Briefly stated, the invention accomplishes the above objects and other advantages by deriving a gating pulse from the highest priority input control signal; and by utilizing this gate, the highest priority signal is allowed to pass and correctly control the intended functions even though a plurality of signals occur simultaneously. This result is further accomplished by the fact that the gates of the lower priority control signals do not function once a higher priority circuit is made operative.

The invention and its manifold objects and advantages will be more clearly understood from the following detailed specification with reference to the accompanying drawings in which:

FIGURE 1 is a schematic diagram of a prior art system utilizing independent control signals as inputs;

FIGURE 2 is a timing diagram to illustrate the operation of the system of FIGURE 1;

FIGURE 4 is a timing diagram illustrating the operation of the invention.

Figure 3:
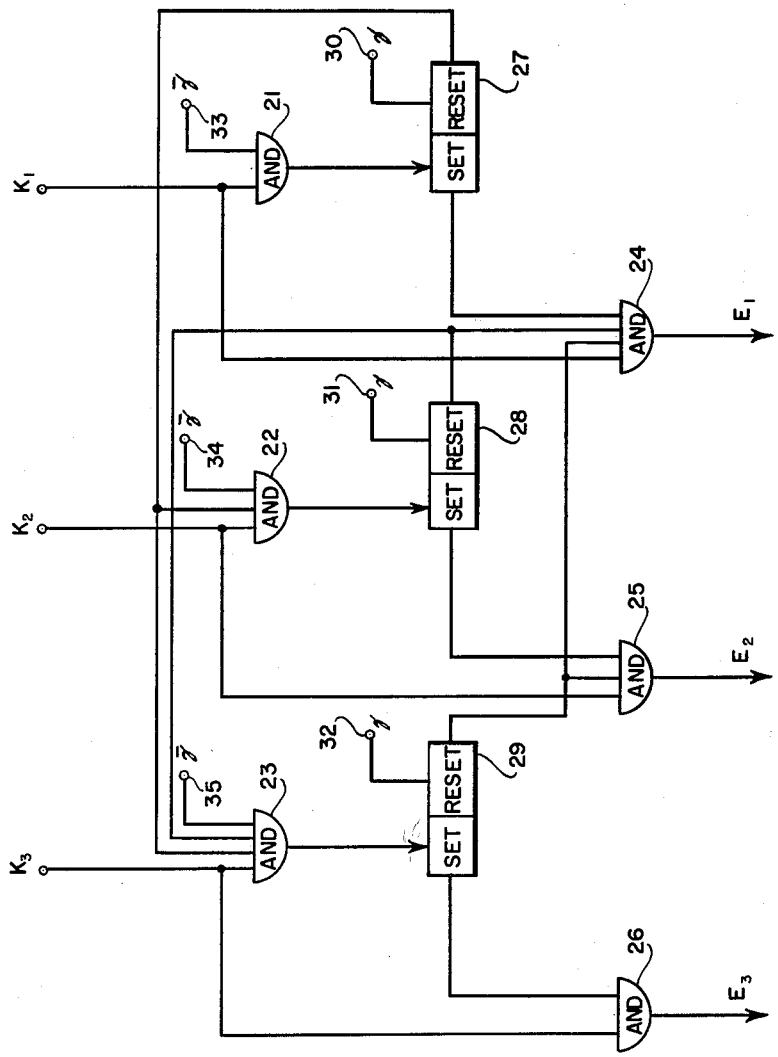
FIGURE 3 is a schematic diagram of a coincidence ambiguity eliminator utilizing the present invention.

For purposes of the present description, "and" and "or" gates are well understood in the art, but briefly however, an "and" gate requires simultaneous occurrence of all inputs in order that an output be produced, whereas an "or" gate has a plurality of inputs, and in which an output is produced by any one or more of the inputs.

Referring now to FIGURE 1, the control signals $K_1$, $K_2$, $K_3$ are applied directly to the respective "and" gates 1, 2 and 3, the output of which is illustrated respectively as $E_1$, $E_2$, and $E_3$. $K_1$ is also applied through an inverter 4 to "and" gates 2 and 3; $K_2$ is also applied through inverter 5 to "and" gates 1 and 3; and $K_3$ is also applied through inverter 6 to "and" gates 1 and 2.

The output signal $E_1$ derived from $K_1$ at the output of "and" gate 1 is applied to "and" gates 7 and 8 for the purpose of controlling binary bits of information I fed to register B. This information is illustrated as applied from separate sources.

Likewise, the output signals $E_2$ and $E_3$ at the output of "and" gates 2 and 3 are applied to the respective "and" gates 9, 10, 11 and 12 to control binary information to register A.

Thus if we assume that the control pulses K occur independently in a "clocked" or synchronous system, then the system of FIGURE 1 is adequate and the gate control signals E are usable. In other words, $K_1$, $K_2$ and $K_3$ either occur simultaneously and cancel each other completely (or partially, in a predetermined manner, if one signal is longer than the other), or they do not occur simultaneously and hence either have no effect on each other, or they partially affect each other in a predictable and usable way. As shown in FIGURE 2a, each of the initial K signals are followed by a second pulse displaced differently, so that the initial signals have no effect on each other, and the second group occur simultaneously. In the former case, distinct E gate pulses are produced; in the latter no E gate pulse is produced.

It becomes readily apparent why the system of FIGURE 1 falls down in all asynchronous systems, if we consider what the gate pulse E of the logical circuit will look like for various phase (or delay) relationships of the independent input control signals $K_1$, $K_2$ and $K_3$. This is evident from FIGURE 2b which represents a non-clocked or asynchronous system. The three (3) K signals occur in a more or less random fashion, and the resulting E gates are obviously unacceptable for digital control. As illustrated, from the first group of K pulses there results a short $E_3$ gate pulse and a longer $E_1$ gate pulse; whereas a still longer $E_3$ gate pulse and a short $E_2$ gate pulse results from the second group. In fact the output of the E gate may vary in duration from a signal width of a few nanoseconds to one of width equal to the input control signal.

There are certain types of operations however, in which it is either not possible or not desirable to control the K signal. Such operations for example are:

(a) Input-output devices randomly requesting computer storage; where a common storage system services all devices and each device is assigned a specific K signal.

(b) Activation of data transmission, where several independent transmissions may be requested simultaneously from a common computer or storage device. Each request is assigned a specific K signal.

(c) Computer instructions occurring asynchronously and perhaps simultaneously as in the case of a fault condition overriding a normal programmed routine.

For these types of operations, the $K_1$, $K_2$ and $K_3$ signals in FIGURE 1 would occur randomly with respect to each other. Since their occurring randomly creates confusion in the circuitry (see FIGURE 2b) a method of eliminating the ambiguity must be installed. Such a method must effectively "synchronize" the occurrence of these random input signals in a manner, such that the system which is being fed by them will operate correctly.

One such method of producing a usable gate pulse E from the randomly occurring K pulses is shown in the network of FIGURE 3. This system eliminates coincidence ambiguity or so called "race" conditions by "weighting" the random input control signals in a priority arrangement. The priority may be fixed or variable according to the requirement of the data processing system in which the method is used.

In FIGURE 3, the signals $K_1$, $K_2$ and $K_3$ are control signals as before and may occur independent and mutually exclusive of each other or completely at random. The signals $K_1$, $K_2$ and $K_3$ are applied to "and" gates 21, 22 and 23, and also to "and" gates 24, 25 and 26. The output of "and" gate 21 is applied to "set-reset" 27, which may conveniently take the form of a conventional flip-flop or bi-stable multivibrator circuit. It is to be noted that one side of the flip-flop 27 is connected as an input to "and" gates 22 and 23. The output from the other side of "flip-flop" 27 is connected to "and" gate 24.

Similarly, the output of "and" gate 22 is applied to "set-reset" or flip-flop 28. One side (reset) of flip-flop 28 is connected as an input to "and" gate 23 and also as an input to "and" gate 24. The other side (set) of flip-flop 28 is applied to "and" gate 25.

The output of "and" gate 23 is applied to flip-flop (set) 29. One output of flip-flop 29 (reset) is applied to both "and" gates 24 and 25 and a second output (set) is applied to "and" gate 26.

The "reset" function of flip-flops 27, 28 and 29 is controlled by a logical signal $\gamma$ at 30, 31 and 32 to reset all of the flip-flops to one state which we may conveniently designate as zero, at the end of each computer function initiated by $K_1$, $K_2$ or $K_3$.

A complementary signal $\overline{\gamma}$ to the "reset" signal is applied to the inputs 33, 34 and 35 of "and" gates 21, 22 and 23.

Upon consideration of FIGURE 3, it can be shown that one and only one output signal E, can exist at a given time, regardless of the randomly occurring nature of the input control signals K.

In order for the highest priority flip-flop 29 to be set to the "one" state from the "zero" state, when its associated signal $K_3$ occurs, it is necessary that all lower priority flip-flops (in this case 27 and 28) be in the "zero" state; and that furthermore, the reset signal at 32 be deactivated. The lowest priority flip-flop 27 depends only upon the complementary condition of the reset signal for it to be "set" when its associated signal occurs; whereas the highest priority flip-flop 29 depends upon the state of all lower priority flip-flops.

Conversely, the highest priority output enabling signal $E_3$ depends only upon the fact that flip-flop 29 has been set to "one" and that the control signal $K_3$ is still present, whereas the lowest priority output enabling signal $E_1$ requires that all higher priority flip-flops be "zero" and that flip-flop 27 be in the "one" state along with the fact that $K_1$ is still present.

Now with reference to FIGURE 3, let us consider the simultaneous (and hence ambiguous) occurrence of input control signals $K_1$, $K_2$ and $K_3$. Furthermore, assume that flip-flops 27, 28 and 29 are all initially in the "zero" state. In this circumstance all of the flip-flops will be simultaneously set to the "one" state from the "zero" state. This is so, because a finite time is required for any flip-flop to change its state, and instantaneously all conditions are met and the flip-flops are set to "one." Of course, immediately after having started to switch from the "zero" to the "one" state, the "set" conditions for only the lowest priority flip-flop 27 are any longer valid. However, the regenerative action of the flip-flops always allows them to complete their switching cycle by the time that cycle has reached the point where it invalidates the "set" logic which started the cycle. In other words, once the flip-flops are initiated, as they would be by an ambiguous condition, each becomes set to "one" and remains so until "reset" at the end of the computer function initiated by the control signal K.

However, as seen in FIGURE 3, although all of the flip-flops have been set to the "one" state, only the highest priority output enabling signal $E_3$ will be activated. This is so, because of the logical "and" gates 24 and 25 which require all of the outputs which are of higher priority than a given signal to be "zero," before that specific output signal can occur. In other words, $E_1$ cannot occur since both flip-flops 28 and 29 are in the "one" state, and $E_2$ cannot occur since flip-flop 29 is in the "one" state.

Thus, in general, when any two or more signals occur simultaneously (presuming all flip-flops are initially in the "zero" state), the respective flip-flops of the signals will be simultaneously set to the "one" state. However, only one output signal will ever occur. That output signal will be the one which is associated with the input signal which has the highest priority among those input signals which occurred simultaneously. Once an enabling signal E has been activated, all other output signals are locked out until termination of the operation, or sequence of operations which were initiated by the activated signal. Also all flip-flops which had been set to the "one" state are reset by appropriate reset signals at the termination of the operation or sequence of operations.

Representative occurrences of input control signals (K) which feed the ambiguity elimination network of FIGURE 3, are shown in FIGURE 4. In 4a, input signals $K_3$ and $K_2$ are illustrated as occurring simultaneously (on the left of the figure), followed at some later time by a group of input signals in which $K_2$ and $K_1$ are coincident. For both cases, the associated flip-flops (F) are set to the "one" state from their initial "zero" state, however, only the highest priority output enabling signal E occurs. That is, $E_3$ occurs from the first group of input signals and $E_2$ from the second.

As the input control signals (K) move away from simultaneous occurrence, operation of the arbiguity elimination network becomes based upon a first-come first served basis. This is shown in FIGURE 4b. The sequencing has been chosen to be identical with that of FIGURE 2b for direct comparison of output signals E of the network of FIGURE 1 with that of the network of FIGURE 3.

Whereas in FIGURE 2b an output from the first group (unusable) is obtained at $E_3$ and $E_1$, the ambiguity is removed in FIGURE 4b, where an output only occurs at $E_3$. Also it is to be noted that the ambiguity is eliminated as to the second group of signals where $E_2$ results in FIGURE 4b, whereas as seen in FIGURE 2b the unusable signals $E_3$ and $E_2$ occur.

It is understood of course that additional control signals K may be utilized by merely adding additional "and" gates such as 21—23, along with an associated flip-flop and enable "and" gates with proper external connections to determine assigned priorities.

While a specific embodiment of the invention has been shown and described it should be understood that certain alterations, modifications and substitutions may be made to the instant disclosure without departing from the spirit and scope of the invention as defined by the appended claims.

I claim:

1. A coincident ambiguity eliminator comprising a plurality of input control signals at least two of which may occur simultaneously, a first plurality of "and" gates responsive to said control signals, a plurality of flip-flop circuits responsive to the outputs of said first "and" gates, a second plurality of "and" gates to which said control signals are applied, means for connecting said flip-flops to said first and second "and" gates in such manner that the first and second "and" gates corresponding to a predetermined priority input control signal will be energized in succession whereby one of said control signals will be selected.

2. An ambiguity eliminator for selecting one of a plurality of coincident control signals, comprising a first plurality of "and" gates each responsive to an input control signal, a second plurality of "and" gates each responsive to said input signal, a plurality of flip-flop circuits each having a set condition and a reset condition, means for energizing said flip-flops for a normal reset condition, means for applying the outputs of said first "and" gates to said flip-flops to energize said set condition, means for applying the output of said set condition to the corresponding second plurality "and" gate, means connecting the output of said reset condition to the second plurality "and" gate of all lower priority signal according to a predetermined priority, and means connecting said reset condition outputs of each flip-flop to said first plurality "and" gates of all priority signals, and means for deriving an output control signal from one of said plurality "and" gates.

3. In a system for selecting one of a plurality of control signals in accordance with a predetermined priority, means for applying each of said signals to first "and" gate and a second "and" gate, a bi-stable multivibrator having first and second conditions, means responsive to the output of said first "and" gate to shift said multivibrator from said first to said second condition, means connecting the output of said second condition to said second "and" gate, and means for connecting the output of said first condition to said second "and" gates of all lower priority signals and to the first "and" gates of all higher priority signals.

4. A system for selecting one of a plurality of coincident control signals in accordance with a predetermined priority, a plurality of first "and" gates, a plurality of second "and" gates, means for applying each of said control signals to a first "and" gate and a second "and" gate, individual means connected between each first "and" gate and the corresponding second "and" gate for applying an enabling pulse to said corresponding "and" gate and for removing enabling pulses to lower priority second "and" gates and from higher priority first "and" gates.

5. The system as defined in claim 3, further including a reset signal for returning said multivibrator from said second condition to said first condition, and means for applying the complementary of said reset signal to said first "and" gates.

6. A signal selection circuit comprising a plurality of sources of asynchronous control pulses, a first "and" gate, a multivibrator and a second "and" gate associated with each source of pulses, means for applying said pulses to said first and second "and" gates, means for normally energizing said multivibrator for operation in one condition, means for connecting the output of said one condition of the multivibrator to the first "and" gates associated with all pulse sources of higher priority and to the second "and" gates associated with all pulse sources of a lower priority, said first gates being responsive to each pulse source and said multivibrator outputs to pass said pulse source to shift said multivibrator to a second condition, means for connecting the pulse resulting from said second condition to said second "and" gates, whereby a control pulse is selected by the highest priority "and" gate to which all required first condition outputs from higher priority multivibrators are applied.

7. In combination, a plurality of asynchronous control signals one of which is to be selected in accordance with a predetermined priority, means for applying each control signal including said highest priority signal to individual first "and" gates, means associated with all lower priority signals for applying enabling pulses to said first "and" gates associated with all higher priority signals, second individual "and" gate means to which each control signal is applied, means associated with each first "and" gate for applying an enabling pulse to each corresponding second "and" gate, means associated with all higher priority signals for applying enabling pulses to said second "and" gates associated with all lower priority signals, and means responsive to the highest priority signal to remove said enabling pulses from said second "and" gates of all lower priority signals.

8. Coincident ambiguity elimination circuitry comprising, a plurality of asynchronous control signals, one of which is to be selected in accordance with a predetermined priority, first and second "and" gate means responsive to individual control signals, means for applying the same control signal to a first and second "and" gate means, bi-stable pulse generating means having a first stable condition and a second stable condition connected between the first and second "and" gate means, and responsive to said first "and" gate for generating gating pulses for said second "and" gate means, means responsive to said second stable condition for removing the gating pulse to said second "and" gate means for all lower priority signals.

References Cited in the file of this patent
UNITED STATES PATENTS
2,636,133    Hussey _____ Apr. 21, 1953